(12) United States Patent
Krenzer

(10) Patent No.: US 9,643,263 B2
(45) Date of Patent: May 9, 2017

(54) MILLING AND BORING TOOL

(71) Applicant: Mapal Fabrik für Präzisionswerkzeuge Dr. Kress KG, Aalen (DE)

(72) Inventor: Ulrich Krenzer, Zirndorf (DE)

(73) Assignee: Mapal Fabrik für Präzisionswerkzeuge Dr. Kess KG, Aalen (DE)

( * ) Notice: Subject to any disclaimer, the term of this patent is extended or adjusted under 35 U.S.C. 154(b) by 178 days.

(21) Appl. No.: 14/386,577

(22) PCT Filed: Mar. 20, 2013

(86) PCT No.: PCT/EP2013/055797
§ 371 (c)(1),
(2) Date: Sep. 22, 2014

(87) PCT Pub. No.: WO2013/139844
PCT Pub. Date: Sep. 26, 2013

(65) Prior Publication Data
US 2015/0050095 A1    Feb. 19, 2015

(30) Foreign Application Priority Data

Mar. 21, 2012   (DE) .................. 10 2012 006 087
May 9, 2012    (DE) .................. 10 2012 009 328

(51) Int. Cl.
*B23C 5/10*    (2006.01)
*B23C 3/02*    (2006.01)

(52) U.S. Cl.
CPC .................. *B23C 5/10* (2013.01); *B23C 3/02* (2013.01); *B23B 2251/046* (2013.01);
(Continued)

(58) Field of Classification Search
CPC ..... B23C 5/10; B23C 3/02; B23C 2210/0492; B23C 2210/285; B23C 2210/287; B23C 2220/52; B23C 2220/605
See application file for complete search history.

(56) References Cited

U.S. PATENT DOCUMENTS 3,749,625 A * 7/1973 Berg .................. B23C 1/00
                                                    144/363
3,913,196 A   10/1975 Maday
(Continued)

FOREIGN PATENT DOCUMENTS

DE      4440567 A1    5/1995
DE      4342557 C2    8/1995
(Continued)

OTHER PUBLICATIONS

English Translation of JP 11129116 A, May 1999.*
(Continued)

*Primary Examiner* — Daniel Howell
*Assistant Examiner* — Alan Snyder
(74) *Attorney, Agent, or Firm* — Stephen T. Olson; Harness, Dickey & Pierce, P.L.C.

(57) ABSTRACT

A milling and boring tool with a tool shaft which comprises a center axis, at least one geometrically defined rough cutter and at least one geometrically defined finishing cutter, and the at least one rough cutter and the at least one finishing cutter respectively comprise a chip groove. The milling and boring tool is characterized in that the chip groove of the at least one finish machining cutter has an opposite twist than the chip groove of the at least one rough cutter.

20 Claims, 1 Drawing Sheet

(52) U.S. Cl.
CPC ...... *B23C 2210/0492* (2013.01); *B23C 2210/285* (2013.01); *B23C 2210/287* (2013.01); *B23C 2220/52* (2013.01); *B23C 2220/605* (2013.01); *B23C 2226/27* (2013.01); *Y10T 407/1948* (2015.01); *Y10T 408/9097* (2015.01); *Y10T 409/303808* (2015.01)

(56) References Cited

U.S. PATENT DOCUMENTS

| | | | |
|---|---|---|---|
| 4,572,714 | A | 2/1986 | Suzuki et al. |
| 5,641,252 | A | 6/1997 | Eriksson et al. |
| 8,142,119 | B2 * | 3/2012 | Volokh ............... B23C 3/02 407/53 |
| 2004/0071517 | A1 | 4/2004 | Pham |
| 2008/0193234 | A1 * | 8/2008 | Davancens ......... B23B 35/00 408/1 R |
| 2012/0051863 | A1 * | 3/2012 | Craig ............... B23B 51/08 408/1 R |
| 2013/0136548 | A1 * | 5/2013 | Takahashi .......... B23C 5/165 407/54 |
| 2013/0294852 | A1 * | 11/2013 | Winebrenner ...... B23C 5/10 407/54 |

FOREIGN PATENT DOCUMENTS

| | | |
|---|---|---|
| DE | 10144735 C5 | 4/2003 |
| EP | 0055142 A2 | 6/1982 |
| FR | 2897547 A1 | 8/2007 |
| JP | S5734405 U | 2/1982 |
| JP | 57-107718 | 5/1982 |
| JP | S6347007 A | 2/1988 |
| JP | H06246525 A | 9/1994 |
| JP | 11129116 A * | 5/1999 |
| JP | 2000141121 A | 5/2000 |
| JP | 2000198010 A | 7/2000 |
| JP | 2000334615 A | 12/2000 |
| WO | 94/11142 A1 | 5/1994 |

OTHER PUBLICATIONS

English Translation of International Preliminary Report on Patentability regarding International Application No. PCT/EP2013/055797 dated Sep. 23, 2014 and Written Opinion of the International Searching Authority.
International Search Report and Written Opinion of the ISA, ISA/EP, Rijswijk, NL, mailed Jun. 12, 2013.
Office Action regarding Japanese Patent Application No. 2015-500905, mailed Nov. 22, 2016. Translation provided.

* cited by examiner

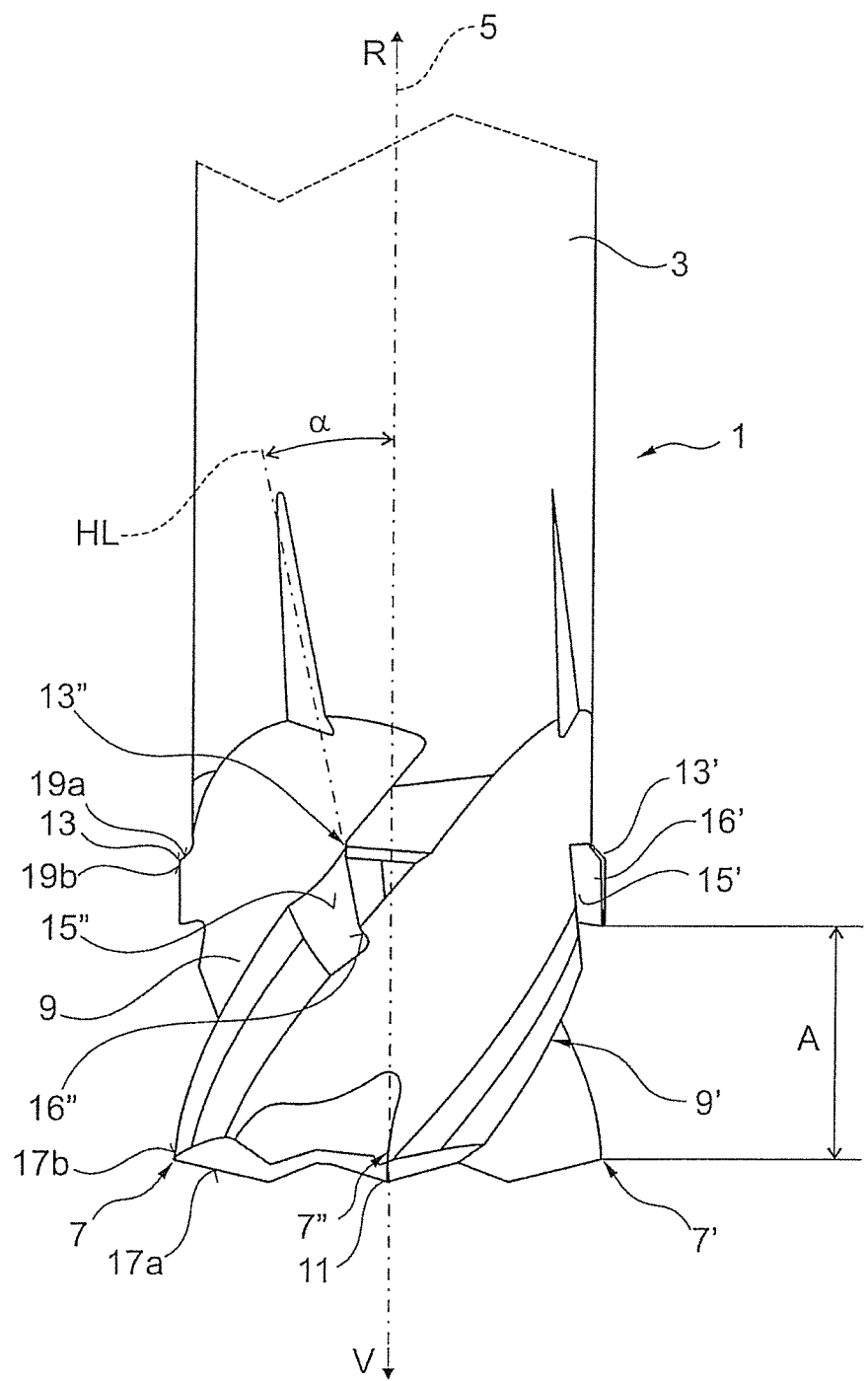

MILLING AND BORING TOOL

CROSS-REFERENCE TO RELATED APPLICATIONS

This application is a 371 U.S. National Stage of International Application No. PCT/EP2013/055797, filed Mar. 20, 2013. This application claims priority to German Patent Applications Nos. 10 2012 006 087.4, filed Mar. 21, 2012 and 10 2012 009 328.4, filed May 9, 2012. The entire disclosures of the above applications are incorporated by reference herein.

FIELD

The invention relates to a milling and boring tool according to the preamble of claim 1. The object of the invention is also a method with the features according to the preamble of claim 10.

BACKGROUND

The use of milling and boring tools in orbital drilling—also called orbital milling—has the advantage that the diameter of the drill hole can be produced within defined limitations, independent of the diameter of the tool. Different drilling diameters can be produced with one and the same tool, which reduces the costs related to the provision and replacement of tools. Another advantage of orbital milling is that, in comparison to drilling, only small advancement forces are required, thus rendering orbital milling extremely well suited to the machining of unstable, thin building components. On the other hand, the drawback arises here that machining times are relatively long, and it is difficult to achieve narrow drilling tolerances over the entire life of the tool. Another drawback, in particular with milling and boring tools having a small diameter, is the large deflection during the machining of drill holes. Therefore relatively small advances must be maintained, which leads to very long machining times and thus relatively high production costs.

SUMMARY

It is therefore the object of the invention to provide a milling and boring tool which avoids these drawbacks.

To achieve this object, a milling and boring tool of the type named above is created at least one geometrically defined finishing cutter, each with one chip groove each. The milling and boring tool is characterized in that the chip grooves of the rough-machining- and finishing cutters are oppositely twisted. Consequently, there is a positive axial rake angle not only during rough machining but also during finish machining, which results in good chip flow and small cutting forces. As a result, the deflection of the milling and boring tool is reduced during the machining process of the workpiece, so that narrow drilling tolerances can be realized, also resulting in shorter machining times and reduced production costs.

In a preferred exemplary embodiment of the milling and boring tool, a provision is made that the at least one rough-machining cutter and the at least one finishing cutter are arranged at an axial distance with respect to each other. Said distance is greater than or equal to the spiral gradient of a helical path on which the milling and boring tool is moved during machining of a workpiece. During orbital milling, the milling and boring tool is set into rotation for machining of a workpiece and additionally moved on a helical path. The axial distance between rough-machining- and finishing cutter is consequentially selected in such manner that it is greater than or equal to the spiral gradient of the helical path, i.e., the axial advancement of the milling and boring tool per helical rotation.

In a preferred exemplary embodiment of the milling and boring tool, a provision is made that the at least one rough cutter and the at least one finishing cutter are arranged at an axial distance with respect to each other which is greater than or equal to the thickness of a workpiece machined with the milling and boring tool. It is thus possible to advance the milling and boring tool toward the workpiece to be machined and move it into a developing or machined drill hole, the at least one rough cutter coming into contact with the workpiece. The rough cutter has machined the workpiece before the finishing cutter comes into contact therewith. It is thus possible to machine the workpiece in a defined manner by means of the fine-machining cutter without the rough cutter coming into contact therewith.

Additional embodiments of the milling and boring tool follow from the sub-claims.

To achieve the object, a method is also proposed characterized in that, during advancement of the milling and boring tool, the workpiece is machined by means of the at least one rough cutter and, during retraction, by means of the at least one finishing cutter. As a result of the opposing twist of the chip grooves associated with the rough-machining- and finishing cutters, it is ensured that there is a positive axial rake angle for both the rough-machining as well as the finishing cutters. This leads to reduced cutting forces and good chip flow. The milling and boring tool cuts extremely well and is "sharper" than traditional tools.

BEST DESCRIPTION OF THE INVENTION

The invention is explained in additional detail below with reference to the drawing. The drawing comprises a single FIGURE which shows a side view of the front portion of a milling and boring tool.

DETAILED DESCRIPTION

The FIGURE thus shows the front end of a milling and boring tool 1 with truncated tool shaft 3 that can be coupled, either directly or via a holding shaft (not shown) with a drive which sets the milling and boring tool 1 into rotation about its center axis 5 and moves it on a helical path in order to machine a drill hole in a workpiece or, optionally, to produce a drill hole.

The milling and boring tool 1 has at least one, in this case, two preferably opposing, rough cutters 7 and 7' with each of which a chip groove 9, 9' is associated. Moreover, the milling and boring tool 1 has at least one, preferably 2, opposing rough cutters, arranged in pairs, of which only the rough cutter 7" is visible here. Said rough cutter 7" comprises an allocated chip groove 9". The preferably diametrically oppositely located rough cutter likewise comprises an associated chip groove.

In the milling and boring tool 1, at least one finish-machine cutter 13 is additionally provided that is arranged at an axial distance relative to the tip 11—measured in the direction of the center axis 5. The exemplary embodiment shown here, a finishing cutter 13' is provided which is preferably located opposite the finishing cutter 13. The exemplary embodiment also has two additional—preferably opposing—finishing cutters, of which is a finishing cutter 13" facing toward the viewer is visible here. The associated diametrically opposed additional finishing cutter is arranged, as it were, on the rear side of the milling and boring tool and is not visible here.

In the milling and boring tool 1 described here, rough-machining- and finishing cutters are thus provided. One proceeds from the premise that, as customary, the rough cutters are used for rough or pre-machining of a workpiece and the finishing cutters are used for fine machining or finishing.

Associated with the finishing cutters 13, 13', 13", as well as with the finishing cutter not shown in the FIGURE, are individual chip grooves, of which are chip groove 15", associated with finishing cutter 13", and chip groove 15', associated with finishing cutter 13', are visible here. Chip areas, of which chip area 16' in the FIGURE is facing the viewer, are associated with the finishing cutters. The chip area 16" of finishing cutter 13" is just covered, and the chip area associated with the finishing cutter 13 is facing away from the viewer.

In looking at the FIGURE, it becomes clear that the tool depicted here rotates counterclockwise when viewed from above toward the end 11; the rough cutter 7', located to the right of the center axis 15 in the FIGURE, thus moves upon rotation of the milling and boring tool 1 out of the image plane toward the viewer, whereas the opposing rough cutter 7 moves into the image plane. The same applies with respect to the finishing cutters 13', and 13. The finishing cutter 13" consequently travels from right to left if the milling and boring tool 1 is set into rotation.

It can be seen from the representation according to the FIGURE that the chip grooves 9, 9' and 9" associated with the rough cutters 7, 7', 7"—including the rough cutter not visible in the FIGURE—have a twist to the right, while the twist of the chip grooves associated with the finishing cutters—of which the chip grooves 15 and 15" can be seen here—exhibit a reverse direction of twist. A provision is made that the rough and finishing cutters 13, 13' and 13" have a positive radial rake angle, which can be recognized in particularly clear fashion with respect to the finishing cutter 13": The associated chip area 16" recedes with respect to the finishing cutter 13".

All of the finishing cutters, of which the finishing cutters 13, 3' and 13" are visible in the FIGURE, additionally present a positive axial rake angle α, which is made clear here in the FIGURE on the basis of the finishing cutter 13': The finishing cutter 13" coincides with the auxiliary line HL; the latter is swiveled counterclockwise with respect to the center axis 5 and encompasses the rake angle α with the center axis. Since the finishing cutter 13" is swiveled counterclockwise relative to the center axis, the axial rake angle occurring during finishing is designated as positive.

Because all chip grooves associated with the rough cutters have a twist to the right, the axial rake angle of the rough cutters—of which the rough cutters 7, 7' 7" are visible in the FIGURE—is positive in rough-machining.

Like the other rough cutters 7', 7" and the opposing associated rough cutter, which is not visible in the FIGURE, the rough cutter 7 has a machining area 17a that is arranged in the area of the front side at the end 11 of the milling and boring tool 1, as well as a cutting region 17b, pointing in the circumferential direction of the milling and boring tool 1.

The finishing cutters have a cutting region 19a facing away from the end 11 of the milling and boring tool 1 and a cutting region 19b, facing in the circumferential direction.

A more detailed description is given below of the function of the milling and boring tool 1 and of a method for chip-removing machining of a workpiece, in particular by means of a milling and boring tool 1 of the type described here:

During machining of a workpiece not shown here, the milling and boring tool 1 is caused to rotate about its center axis 5. It rotates in the counterclockwise direction when viewing the front side positioned at the bottom in the FIGURE; it thus rotates to the right. Accordingly, the chip grooves 9 of the at least one rough cutter 9 have a twist to the right. Milling and boring tools 1 rotating to the left accordingly have a chip groove associated with at least one rough cutter 7 with a twist to the left.

At the same time, the milling and boring tool 1 is moved on a helical path during machining of a workpiece. For the purpose of the pre-machining of the workpiece by means of at least the one rough cutter 7, the milling and boring tool 1 is displaced in the direction of its center axis, which is indicated by arrow V in the FIGURE. During this displacement in the direction of the arrow V, which is referred to as advancement, the milling and boring tool 1 is moved into a drill hole. The milling and boring tool 1 can be embodied as a reaming tool. However, if the cutters in the end region 11 are appropriately designed, it is also possible to cut into solid material by means of the milling and boring tool 1.

Upon advancement in the direction of the arrow V, the cutting region 17a of the at least one rough cutter 7 comes into contact with the workpiece. In addition, the cutting areas 17b oriented in circumferential direction machine the workpiece, namely the interior wall of a drill hole. The chips removed by the rough cutters are carried away out of the working area by the at least one chip groove 9, 9', 9" of the at least one rough cutter 7, 7', 7", so that they do not damage the surface of the workpiece and there is no chip accumulation, which might lead to breakage of the milling and boring tool 1.

The milling and boring tool 1 is pushed forward in the direction of the center axis according to the arrow V, over an axial distance A, which corresponds to the distance, measured in center axis 5 direction, between at least the one rough cutter 7 and at least the one finishing cutter 13. In a first preferred exemplary embodiment of the milling and boring tool, the distance A corresponds approximately to the thickness of the workpiece machined using the milling and boring tool 1.

In a first variant of this first exemplary embodiment, the at least one rough cutter 7 is positioned at a radial distance to the center axis 5, which is equal to the radial distance of the at least one finishing cutter 13. If a milling and boring tool 1 of such design is employed for machining of a workpiece, the milling and boring tool 1 is moved, as required, on a helical path in arrow V direction in the direction of its center axis 5 until the at least one rough cutter 7 has exited, preferably entirely, from the machined workpiece. As a result of the distance A, which corresponds approximately the thickness of the workpiece, the at least one finishing cutter 13 does not come into contact with the interior wall of the drill hole produced in the workpiece until the rough-machining has been completed by means of the at least one rough cutter 7. Upon exiting of the at least one finishing cutter 7, the milling and boring tool 1 is pushed further forward in the direction of arrow V, until also the at least one finish-machine cutter 13 has exited from the workpiece. Since the radial distance of the at least one rough cutter 7 and the at least one finishing cutter 13 is the same in this specific embodiment of the milling and boring tool 1, in the ideal case, the at least one finishing cutter 13, in said further forward movement in arrow V direction, does not remove any chips. During the rough-machining process, since the milling and boring tool 1 is deflected to the inside by the cutting force acting upon the at least one rough cutter 7, with respect to the machined drill hole, the milling and boring tool 1, upon exiting of the at least one rough cutter 7 from the workpiece, acts resiliently to the outside, so that the at least one finishing cutter 13 removes during further forward movement, extremely fine chips from the drill hole wall. Their thickness depends upon the outward movement of the milling and boring tool 1, which, as a rule, cannot exactly be specified in advance. Therefore, after the at least one finishing cutter 13 has exited from the workpiece in the direction of the arrow V, the radius of the helical path, on which the milling and boring tool 1 is moved, is slightly increased and subsequently shifted in the opposite direction along its center axis 5, also shifted along the arrow R. During this retracting movement, the at least one finishing cutter 13 comes into contact with the drill hole surface produced. Both the cutting region 19a and the cutting region 19b remove chips from the drill hole wall. Prior to the start of the finishing of the drill hole surface by means of the first embodiment, the radius of the helical path is increased by only a few tenths of a millimeter, preferably by $2/10$ mm to $5/10$ mm with respect to the radius of the rough-machining procedure. As a result, during the return movement of the milling and boring tool 1 in the direction of the arrow R, extremely thin chips are carried away from the drill hole wall, which cause only a very minor deflection of the milling and boring tool 1. This enables very high drilling quality to be obtained. Moreover, as a result of the reverse twist direction of the at least to the one finish-machining cutter 13 allocated chip groove, a positive axial cutting angle is produced and only insignificant cutting force is produced, which likewise contributes to the reduction in deflection forces of the milling and boring tool 1 during machining of the workpiece.

In a modification of the abovementioned first exemplary embodiment of the milling and boring tool 1, a provision is made that the radial distance of the at least one finishing cutter toward the center axis 5 is a little larger than the radial distance of the at least one rough cutter 7 toward the center axis 5. A provision is made here that the distance is greater by a few tenth millimeters, preferably by $9/10$ to $5/10$ mm than that of the at least one rough cutter 7.

During use of this embodiment, the milling and boring tool 1 is pushed forward during rough machining of the workpiece in the direction of the arrow V, that is, upon commencement of machining of the workpiece, it is pushed forward by the distance A, which corresponds to the distance—measured in axial direction—between the at least one rough and the at least one finishing cutter. Upon completion of rough machining and retraction of the at least one rough cutter 7 in the direction of arrow V from the workpiece, and before at least the one finishing cutter 13 comes into contact with the workpiece, the radius of the helical path is reduced to the extent that the milling and boring tool 1 can be moved through the drill hole in the prior machined workpiece, until such point when the at least one finishing cutter 13 has also exited from the workpiece, without the at least one finishing cutter 13 touching the workpiece during this step. The radius of the helical path is then increased again to its original value. Subsequently, the milling and boring tool 1 is moved out of the machined drill hole in the opposite direction, namely in the direction of arrow R, along its center axis 5, so that the at least one finishing cutter 13 comes into contact with the drill hole wall. The thin chips, removed by the at least one finishing cutter 13 are carried away, out of the machining region, the same as with machining of a workpiece by means of the first embodiment of the milling and boring tool 1, via the chip groove 15, associated with the at least one finish-machine cutter 13.

In both specific embodiments, the milling and boring tool 1 is equipped, preferably with at least two, preferably oppositely positioned, and pair-wise arranged, rough-machining- and/or finishing cutters. As is apparent from the FIGURE, this layout provides for respectively pair-wise oppositely positioned rough cutters 7 and finishing cutters 13, and the four rough-machining- and the four finishing cutters are arranged with respect to each other in an axial distance A, measured in the direction of the center axis 5, which corresponds to the thickness of the workpiece to be machined.

Both embodiments of the milling and boring tool 1 have in common that the developing deflection forces which act upon the milling and boring tool 1 are clearly reduced as a result of allocated chip grooves, which are oppositely oriented, with chip grooves being assigned to the at least one rough-machining and the at least one finishing cutter.

In a second exemplary embodiment of the milling and boring tool 1, a provision is made that at least the one finish machining cutter 13 of the at least one rough cutter 7, which is arranged in the area of top 11 of the milling and boring tool 1, lags in the axial direction, i.e., in the direction of the center axis 5 by a distance that is independent of the thickness of the workpiece to be machined. The distance can therefore be smaller than the distance A, as shown in the FIGURE. Preferably, the at least one finish-machine cutter 13 is arranged at the rear end of the at least one rough cutter when viewed in the direction of the center axis 5.

Especially preferably, a provision is made that the axial distance A between the rough-machining- and the finishing cutters is greater than or equal to the spiral gradient of the helical path on which the milling and boring tool 1 is moved during the machining of a workpiece, with the term "spiral gradient" referring to the forward push in the axial direction per helical rotation.

Like in the first exemplary embodiment and the two variants, a provision is also made here that the at least the one finishing cutter 13 removes thin chips from the drill hole wall when exiting from the machined drill hole produced or machined by at least the one finishing cutter 7 and finishes the drill hole to the prescribed measurement.

The at least one rough cutter 7 provided in the region of tip 11 of the milling and boring tool 1 can be embodied such that a drill hole is produced in a workpiece by machining solid material. A commensurately designed milling and boring tool 1 can thus be employed instead of a solid drill. However, it is also conceivable to design the at least one rough cutter 7 so that it is possible to only enlarge existing drill holes.

To produce or machine a drill hole by means of the second exemplary embodiment of the milling and boring tool 1, the latter is first moved toward a workpiece in the direction of the arrow V depicted in the FIGURE, and moved into it, so that rough machining occurs with the at least one rough cutter 7 during the advancement. Since as the at least one finishing cutter 13 follows the at least one rough cutter 7 preferably directly, the at least one finishing cutter ideally does not remove any chips from the drill hole wall during advancement in the direction of the arrow V. It may happen that the processed material, after rough-machining, will somewhat recoil, and is then machined with the at least one finishing cutter 11.

After both the at least one rough cutter 7 and the at least one finishing cutter 13 have retracted from the workpiece in the direction of the arrow V, the advancement of the milling and boring tool 1 is reversed—it is moved back in the direction of arrow R.

It is possible to move the milling and boring tool on the identical helical path. In that case, the at least one finishing cutter 13 removes chips from the drill hole wall because the milling and boring tool 1 was deflected during the rough-machining step to the interior of the drill hole and is able to spring back after retraction of the at least one rough cutter 7 from the machined drill hole. With the at least one finishing cutter 13, the final and finish-machining of the drill hole is performed during the return- and/or backward movement in the direction of the arrow R. Fine and thin chips are removed from the drill hole wall, and such minor cutting forces occur that only an insignificant deflection takes place of the milling and boring tool 1 attaining desired drilling quality and predetermined drill hole diameter.

After retraction of both the at least one rough cutter 7 and the at least one finishing cutter 13 during advancement in the direction of the arrow V, the radius of the helical path can also be somewhat increased, preferably by $2/10$ mm to $5/10$ mm, so as to execute, in an opposite movement of the milling and boring tool 1 in the direction of the center axis 5 according to arrow R, finishing with respect to the produced drill hole surface by means of the at least one finishing cutter 13.

From the explanations relating to the construction of the milling and boring tool 1, and with respect to the method for machining of a tool in a rough machining and finishing step, it becomes clear for both exemplary embodiments and for all variants that a chip groove 9 is associated with at least the one rough cutter 7 and a chip groove 15 with the at least one finishing cutter 13, whose twist is oriented in the opposite direction of the twist for chip groove 9. Due to this opposing twist, it is ensured with respect to rough-machining of a workpiece that the at least one rough cutter has a positive axial rake angle and that this also applies with respect to the at least one finishing cutter, which encompasses, a positive axial rake angle $\alpha$ with the center axis 5 of the milling and boring tool 1, as it is shown in the FIGURE in connection with the finishing cutter 13". It should be pointed out that if the milling and boring tool 1 has several rough cutters 9, and several finishing cutters 13, all cutters have a positive axial rake angle.

As a result of the positive axial rake angle, it is achieved that, during rough machining and finishing of a workpiece, there occurs a reduction in the cutting forces and excellent chip flow in the respective chip grooves is guaranteed of the chips removed by the cutters. The milling and boring tool 1 has excellent cutting properties and it has more effective cutting capacity than traditional tools. This contributes to the fact that in the machining of fiber compound material with the milling and boring tool 1, the described fibers are optimally cut off and do not protrude into the interior of the machined drill hole.

The good cutting characteristics of the milling and boring tool of the kind described here do not only come into play during the machining of workpieces made of metal, plastic or the like but also particularly during the machining of fiber compound materials.

When using the milling and boring tool 1 described here, in both exemplary embodiments, rough machining is performed during advancement in the direction of the arrow V, and finishing is performed during the return movement in the direction of arrow R. By virtue of the geometry of the milling and boring tool 1 described here, substantially better higher drilling quality is achieved compared to the use of traditional tools. In addition, greater advancement can be achieved because the tool deflection during rough machining is subsequently compensated for during finishing.

The invention claimed is:

1. A milling and boring tool comprising:
   a tool shaft having a center axis;
   at least one geometrically defined rough cutter; and
   at least one geometrically defined finishing cutter,
   wherein the at least one rough cutter and the at least one finishing cutter both respectively comprise a chip groove; and
   wherein the chip groove of the at least one finishing cutter has an opposite twist than the chip groove of the at least one rough cutter.

2. The milling and boring tool as set forth in claim 1, wherein the at least one rough cutter has a cutting segment located in a peripheral surface area of the milling and boring tool.

3. The milling and boring tool as set forth in claim 1, wherein the at least one rough cutter and the at least one finishing cutter are arranged at an axial distance as measured in a direction along the center axis which is greater than or equal to a spiral gradient of a helical pathway on which the milling and boring tool is moved during machining of a workpiece.

4. The milling and boring tool as set forth in claim 1, wherein at least one rough cutter and the at least one finishing cutter are arranged at an axial distance as measured in a direction along the center axis which is greater than or equal to a thickness of a workpiece machined with the milling and boring tool.

5. The milling and boring tool as set forth in claim 1, wherein the radial distance of the at least one finishing cutter to the center axis is greater than the radial distance of the at least one rough cutter to the center axis.

6. The milling and boring tool as set forth in claim 1, wherein the at least one further rough cutter and/or the at least one finishing cutter are arranged in pairs.

7. The milling and boring tool as set forth in claim 1, comprising two opposing rough and finishing cutters respectively arranged in pairs.

8. The milling and boring tool as set forth in claim 1, wherein at least the one rough cutter has a positive axial rake angle.

9. The milling and boring tool as set forth in claim 1, wherein at least the one finishing cutter has a positive axial rake angle.

10. The milling and boring tool as set forth in claim 1, wherein the tool is a drilling tool.

11. A method for the machining of a workpiece with a milling and boring tool as set forth in claim 1, comprising the following steps:
    advancement of the rotating milling and boring tool moved on a helical pathway into a workpiece, and machining of the workpiece with at least one rough cutter,
    retraction of the rotating milling and boring tool moved on a helical pathway from the machined bore, and machining of the workpiece with at least one finishing cutter.

12. The method as set forth in claim 11, wherein the radius of the helical pathway is of equal size during advancement and retraction of the milling and boring tool.

13. The method as set forth in claim 11, wherein the radius of the helical pathway is smaller during advancement than the radius of the helical pathway during retraction of the milling and boring tool from the drill hole.

14. The milling and boring tool as set forth in claim 6, wherein the pairs are arranged opposite each other.

15. The milling and boring tool as set forth in claim 1, wherein:
    each rough cutter includes a machining area in a front side area at an end of the tool and a circumferentially facing cutting region, and
    each of the finish cutters includes a rearwardly facing cutting region facing away from the end of the tool.

16. The method as set forth in claim 11, wherein:
    machining of the workpiece with at least one rough cutter includes removing a plurality of rough cut chips from the workpiece;
    machining of the workpiece with at least one finish cutter includes removing a plurality of finish cut chips from the workpiece; and
    the rough cut chips being greater in size than the finish cut chips.

17. A milling and boring tool comprising:
    a tool shaft having a center axis;
    at least one geometrically defined rough cutter; and
    at least one geometrically defined finishing cutter,
    wherein the at least one rough cutter and the at least one finishing cutter both respectively comprise a chip groove;
    wherein the chip groove of the at least one finishing cutter has an opposite twist than the chip groove of the at least one rough cutter; and
    wherein at least one rough cutter and the at least one finishing cutter are arranged at an axial distance as measured in a direction along the center axis which is greater than or equal to a thickness of a workpiece machined with the milling and boring tool.

18. The milling and boring tool as set forth in claim 17, wherein:
    each rough cutter includes a machining area in a front side area at an end of the tool and a circumferentially facing cutting region, and
    each of the finish cutters includes a rearwardly facing cutting region facing away from the end of the tool.

19. A milling and boring tool comprising:
    a tool shaft having a center axis;
    at least one geometrically defined rough cutter; and
    at least one geometrically defined finishing cutter,
    wherein the at least one rough cutter and the at least one finishing cutter both respectively comprise a chip groove; and
    wherein the chip groove of the at least one finishing cutter has an opposite twist than the chip groove of the at least one rough cutter;
    wherein a first radial distance of the at least one finish cutter to the center axis is greater than a second radial distance between the at least one rough cutter to the center axis.

20. The milling and boring tool as set forth in claim 19, wherein:
    each rough cutter includes a machining area in a front side area at an end of the tool and a circumferentially facing cutting region, and
    each of the finish cutters includes a rearwardly facing cutting region facing away from the end of the tool.

\* \* \* \* \*